US009170950B2

(12) United States Patent
Dube et al.

(10) Patent No.: US 9,170,950 B2
(45) Date of Patent: *Oct. 27, 2015

(54) METHOD, APPARATUS AND COMPUTER PROGRAMS PROVIDING CLUSTER-WIDE PAGE MANAGEMENT

(71) Applicant: International Business Machines Corporation, Armonk, NY (US)

(72) Inventors: Parijat Dube, Yorktown Heights, NY (US); Xavier R. Guerin, White Plains, NY (US); Seetharami R. Seelam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 278 days.

This patent is subject to a terminal disclaimer.

(21) Appl. No.: 13/742,530

(22) Filed: Jan. 16, 2013

(65) Prior Publication Data

US 2014/0201302 A1   Jul. 17, 2014

(51) Int. Cl.
G06F 15/167 (2006.01)
G06F 12/08 (2006.01)
G06F 17/30 (2006.01)

(52) U.S. Cl.
CPC ............ *G06F 12/084* (2013.01); *G06F 12/08* (2013.01); *G06F 17/30* (2013.01); *G06F 2212/152* (2013.01); *G06F 2212/163* (2013.01)

(58) Field of Classification Search
USPC ......................................... 709/212, 213, 217
See application file for complete search history.

(56) References Cited

U.S. PATENT DOCUMENTS

| 8,050,251 | B2 | 11/2011 | Ongole et al. |
| 8,176,270 | B2 | 5/2012 | Wade et al. |
| 8,190,823 | B2 | 5/2012 | Waltermann et al. |
| 8,209,506 | B2 | 6/2012 | Yueh |
| 2011/0125974 | A1 | 5/2011 | Anderson |
| 2011/0179415 | A1 | 7/2011 | Donnellan et al. |
| 2012/0023300 | A1 | 1/2012 | Tremaine et al. |
| 2013/0024645 | A1* | 1/2013 | Cheriton et al. ............... 711/206 |
| 2014/0047062 | A1* | 2/2014 | Krueger et al. ............... 709/216 |

FOREIGN PATENT DOCUMENTS

EP    2474932 A    7/2012

OTHER PUBLICATIONS

C.V. Nagar, "VMDFS: Virtual Memory Based Mobile Distributed File System", International Journal of Multimedia and Ubiquitous Engineering, vol. 2, No. 3 Jul. 2007.
(Continued)

*Primary Examiner* — Umar Cheema
*Assistant Examiner* — Marshall McLeod
(74) *Attorney, Agent, or Firm* — Harrington & Smith

(57) ABSTRACT

An exemplary method in accordance with embodiments of this invention includes, at a virtual machine that forms a part of a cluster of virtual machines, computing a key for an instance of a memory page that is to be swapped out to a shared memory cache that is accessible by all virtual machines of the cluster of virtual machines; determining if the computed key is already present in a global hash map that is accessible by all virtual machines of the cluster of virtual machines; and only if it is determined that the computed key is not already present in the global hash map, storing the computed key in the global hash map and the instance of the memory page in the shared memory cache.

14 Claims, 4 Drawing Sheets

(56) References Cited

OTHER PUBLICATIONS

H. Jin et al., "ChinaV: Building Virtualized Computing System", The 10th IEEE International Conference on High Performance Computing Communications, 2008.

T. Newhall et al., "NSWAP: A Network Swapping Module for Linux Clusters", Proceedings of Euro-Par '03 International Conference on Parallel and Distributed Computing, Klagenfurt, Austria; Aug. 2003, Lecture Notes in Computer Science, vol. 2790, Springer.

T, Newhall et al, "Incorporating Network RAM and Flash Into Fast Backing Store for Clusters", Proceedings of IEEE Cluster Conference, Austin, TX Sep. 2011.

R. Ceron et al., "Power Systems Memory Duplication", IBM Technical Support Organization, Redpaper, Feb. 2012, REDP-4827-00.

W. Voorsluys, "Cost of Virtual Machine Live Migration in Clouds: A Performance Evaluation", Proceeding CloudCom '09 Proceedings of the 1st International Conference on Cloud Computing, pp. 254-265, Year 2009.

\* cited by examiner

METHOD, APPARATUS AND COMPUTER PROGRAMS PROVIDING CLUSTER-WIDE PAGE MANAGEMENT

TECHNICAL FIELD

The exemplary embodiments of this invention relate generally to multi-processor and to cloud computing environments and relate more specifically to virtual machines (VMs), clusters of virtual machines such as those found in a cloud environment, distributed shared memory, de-duplication, page swapping and remote direct memory access (RDMA) interconnects.

BACKGROUND

In some conventional systems, such as in a single server system, pages are swapped to disk on demand by an Operating System or a Hypervisor. A Hypervisor or virtual machine manager (VMM) can be thought of as computer software, firmware and/or hardware that creates and runs virtual machines (VMs). In these conventional systems memory pages are copied from memory to disk by an operating system or a hypervisor when either of them reaches the limits of its memory allocation.

A problem is presented in that swapping pages from memory to disk is a relatively slow operation that has a significant impact on processor and input/output (I/O) resources and time, even more so when both the hypervisor and the operating system contained in its VMs swap memory at the same time.

A correlated problem is presented when identical pages are swapped from memory to disk. Two identical pages take the same time to swap, and two identical pages consume two different, slots in a page file. When multiple servers with comparable workloads are considered the probability of having identical pages across the cloud environment is increased. This redundancy is an other added resource waste in the paging process.

SUMMARY

In accordance with an aspect of the embodiments of this invention a method includes at a virtual machine that forms a part of a cluster of virtual machines, computing a key for an instance of a memory page that is to be swapped out to a shared memory cache that is accessible by all virtual machines of the cluster of virtual machines; determining if the computed key is already present in a global hash map that is accessible by all virtual machines of the cluster of virtual machines; and only if it is determined that the computed key is not already present in the global hash map, storing the computed key in the global hash map and the instance of the memory page in the shared memory cache.

In accordance with another aspect of the embodiments of this invention a computer-readable storage medium contains data representing computer-executable program code. Execution of the program code results in operations that comprise, at a virtual machine that forms a part of a cluster of virtual machines, computing a key for an instance of a memory page that is to be swapped out to a shared memory cache that is accessible by all virtual machines of the cluster of virtual machines; determining if the computed key is already present in a global hash map that is accessible by all virtual machines of the cluster of virtual machines; and only if it is determined that the computed key is not already present in the global hash map, storing the computed key in the global hash map and the instance of the memory page in the shared memory cache.

In accordance with yet another aspect of the embodiments of this invention a data processing system comprises a plurality of virtual machines each having associated memory pages; a shared memory page cache that is accessible by each of the plurality of virtual machines; and a global hash map that is accessible by each of the plurality of virtual machines. In the system, and for a particular memory page stored in the shared memory page cache that is associated with two or more of the plurality of virtual machines, there is a single key stored in the global hash map that identifies at least a storage location in the shared memory page cache of the particular memory page.

BRIEF DESCRIPTION OF THE SEVERAL VIEWS OF FOE DRAWINGS

DETAILED DESCRIPTION

The embodiments of this invention enable page de-duplication at a page file level across a cloud-like system, as opposed to operating at the level of a disk as in conventional approaches. De-duplication cars generally be considered as a process for eliminating duplicate or redundant information, such as redundant memory pages Chat are swapped out (of execution memory) to page storage.

The use of the embodiments of this invention enable a reduction in the cost of a live virtual machine migration between physical servers by enabling access to swapped-out pages to an entire network (i.e., access to swapped out pages is made cluster-wide). The embodiments enable physical page de-duplication and facilitate the migration of live virtual machines by providing a distributed approach to memory page swapping to physical disks and/or to in-memory page storage. De-duplication is made possible not only at the level of the server, but at the level of the entire cloud environment containing multiple instantiations of VMs.

Embodiments of this invention provide a globally shared, in-memory page repository wherein pages are stored and referenced by a remote hash map. The accesses to hash map data preferably use high speed remote direct memory access (RDMA) low-latency interconnects. Infiniband is one common RDMA implementation.

The embodiments of this invention build a unique hash code for each memory page enabling page de-duplication to be achieved by construction (hash map).

Figure 1:
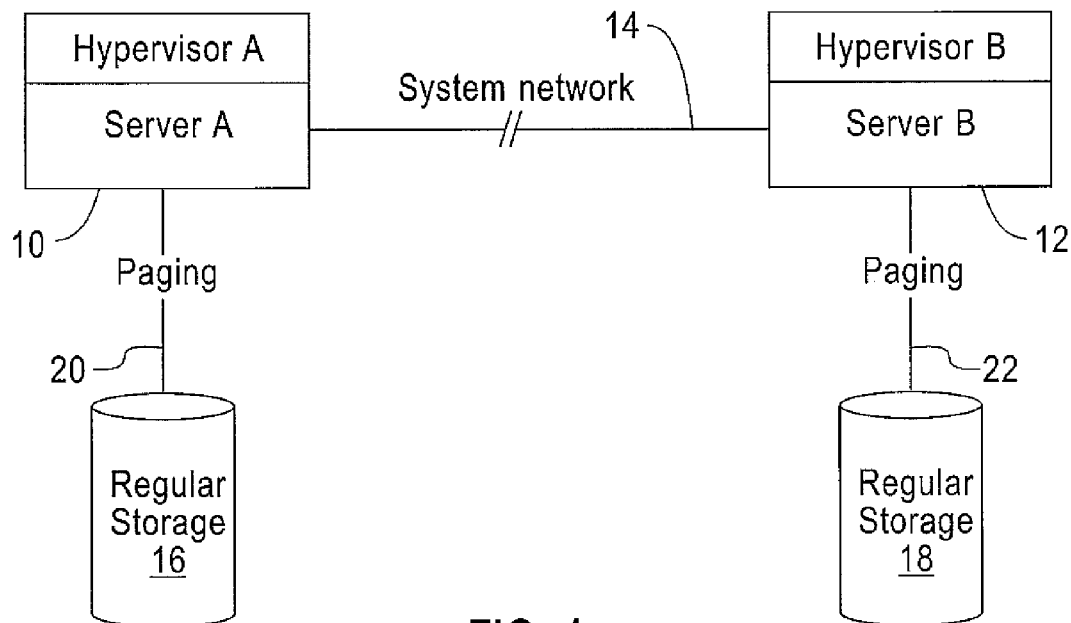
FIG. 1 is a block diagram showing a conventional cloud network overview.

FIG. 1 is a block diagram showing an overview of a conventional cloud network. In this example there are two servers 10 and 12 (Server A and Server B) each including a hypervisor (Hypervisor A and Hypervisor B). The servers 10 and 12 are connected via a system network 14. Each server 10 and 12 includes an associated storage 16 and 18 (Regular Storage A and Regular Storage B). Each storage 16 and 18 can typically be disk-based. Memory pages are swapped between the servers 10, 12 and their respective storages 16, 18 over (high latency) paging interconnects 20 and 22, respectively.

As was noted above, when multiple servers are present the probability can increase of having multiple identical pages stored in the storages 16 and 18. Swapping these identical pages multiple times wastes I/O resources and time especially when the storages 16 and 18 are disk-based and thus exhibit significant read/write/seek latencies.

More specifically, when memory is over-committed some memory pages will be swapped from execution memory (e.g., high speed DRAM resident in the server) to disk. However, in that disk accesses are orders of magnitude slower as compared to memory accesses, if a swapped page is needed by an application being executed by a VM, and thus must be re-loaded from the disk to the execution memory, the application can experience a dramatic reduction in performance.

To avoid this situation some cloud clusters seek to avoid memory over-commitment by taking a conservative approach and under-committing the memory. However, for cloud systems to be effective in both cost and performance they must be able to handle the memory over-commitment scenario with extreme application densities, while also avoiding the undesirable performance-impairing effects of memory page swaps to disk.

The embodiments of this invention provide a distributed shared memory-based page swap system that addresses and overcomes this and similar problems.

In accordance with non-limiting examples of embodiments of this invention an operating system (OS) kernel (Hypervisor or Hypervised) is configured to swap memory pages into a remote, shared (global) memory cache using low-latency interconnects (such as RDMA-enabled interconnects). The swapped-out pages are globally shared between servers/VMs at the cluster level (cloud level), and are each uniquely identified using a hash code.

The use of these exemplary embodiments provides significant improvements in page swapping latency by orders of magnitude (i.e., some tens of milliseconds versus some tens of microseconds). The use of these exemplary embodiments also provides a significant reduction in the required storage footprint by providing a global de-duplication of swapped-out memory pages. The use of these exemplary embodiments also provides for an acceleration of live virtual machine (VM) migration.

More specifically, as opposed to packing all relevant memory pages, both live pages and dormant (swapped-out) pages, and sending these memory pages from one VM to another VM—the Hypervisor swaps-out all of the pages of the VM via the RDMA interconnect (which is extremely efficient) and then only has to send a lightweight descriptor (related to the hash) of the swapped-out pages to the target VM. The receiving VM simply has to restart the VM by automatically swapping-in pages using the lightweight descriptor.

Figure 2:
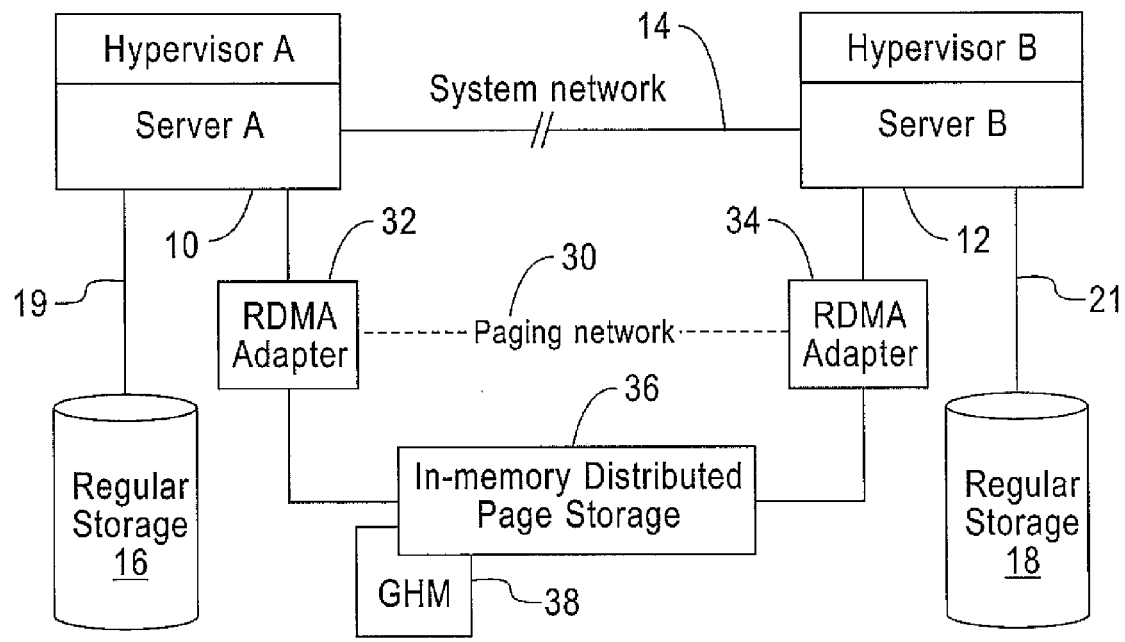
FIG. 2 is a block diagram showing a system overview with in-memory distributed page storage in accordance with embodiments of this invention.

Referring to FIG. 2, in the exemplary embodiments what is sent to a target VM (e.g., Server B 12) during a VM migration, after all memory pages have been paged out to an in-memory distributed page storage 36 (the remote, shared (global) memory cache), via an RDMA adapter 32, is a list of keys (for example a hashed code of a key), where the key uniquely identifies a memory page stored in the in-memory distributed page storage 36. The Server B is then enabled to page-in relevant memory pages from the in-memory distributed page storage 36 via the RDMA adapter 34.

The RDMA adapters 32 and 34, in combination with the in-memory distributed page storage 36, can be considered to constitute a memory paging network 30. In this embodiment the regular storage 16 and regular storage 18 need not contain any swapped-out memory pages, as in the embodiment of FIG. 1. Instead they can store just, for example, an associated operating system (OS) and file system, plus any related data and data structures. The swapped out memory pages are instead stored in the global in-memory distributed page storage 36, and are each identified by an associated key that itself can be hashed. Those memory pages that are common to two or more VM instantiations need only be stored once, and identified by the associated key.

The use of the exemplary embodiments provides in-memory swapped-out page de-duplication that incorporates a global hash map (GHM) 38 that can be stored at the in-memory distributed page storage 36 as shown in FIG. 2. Note that the GHM 38 can be stored separately from the memory pages or it can be stored in a distributed fashion with the memory pages. The use of these exemplary embodiments significantly reduces page swapping time (e.g., 10 μs as opposed to 100 ms), and furthermore enables the over-committed memory scenario to be used without suffering adverse page swapping delay impacts.

The use of the exemplary embodiments provides a memory page identifier in the remote, shared (global) memory cache 36 that is used to generate a unique key representing a memory page. The key is hashed and can be inserted with the memory page in the in-memory distributed page storage 36. One non-limiting example of key is:

PROCESS_NAME+VADDR, where PROCESS_NAME is the name of a software process/routine associated with the memory page and VADDR is the virtual address of the memory page in the in-memory distributed page storage 36. Based on this information a VM is enabled to load the associated memory page. As was noted above the key can be hashed to reduce the number of bits needed to represent the key.

There are a number of known types of hash functions and algorithms that can be employed by the Hypervisor including, but not limited to: Additive, Rotating, One-at-a-Time, Bernstein, FNV, Pearson and CRC.

The use of the exemplary embodiments of this invention further provides a global swapped page in-memory repository, embodied as the in-memory distributed page storage 36 and enabling the use of low-latency, e.g., RDMA-enabled networks. The embodiments provide a mechanism to extend memory page de-duplication to an entire cloud comprised of multiple instantiations of VMs running various applications, but which can share common memory pages. The embodiments enable in one aspect thereof a fast migration of a VM from one instantiation to another simply by passing a list of keys representing all VM memory pages (live (active) pages and already swapped-out (dormant) memory pages). Due to the use of the low-latency e.g., RDMA-enabled networks, fetching a page over the paging network 30 from the in-memory page storage 36 incurs minimal overhead.

It should be pointed out that the globally accessible memory page storage 36 could, in some embodiments, be partially or wholly based on disk storage. In this case the RDMA-enabled network and adapters 32, 34 could be replaced by another type of data transfer network that is configured and optimized for disk-based data read/write accesses.

In the various embodiments of this invention a first VM can send the plurality of (hashed) keys to the second VM, or the first VM can send the second VM a pointer to a data structure that contains the plurality of keys thereby enabling the second VM to access the data structure and retrieve the plurality of keys. The data structure can be stored, in the global hash map (GHM) 38 that can form a part of the in-memory distributed page storage 36.

The embodiments of this invention provide a method, and structure for managing memory pages in a data processing system that comprises a plurality of virtual machines, such as in a cloud computing environment, by providing a single shared storage for memory pages that is accessible to all of the virtual machines via low latency interconnects.

Figure 3:
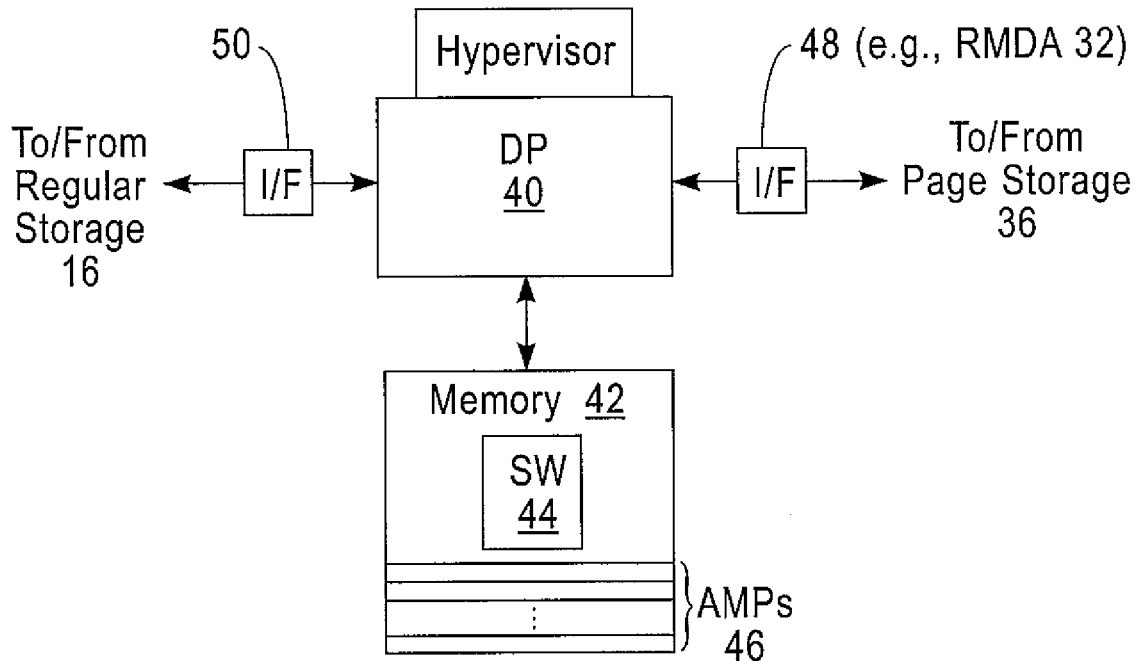
FIG. 3 shows an example of one of the virtual machines shown in FIG. 2.

FIG. 3 shows an example of one of the virtual machines shown in FIG. 2, such as the virtual machine 10. The virtual machine 10 includes at least one data processor (DP) 40 connected with at least one memory 42 that stores computer program code embodied as software (SW) 44 that when executed results in performance of methods in accordance with the invention. The SW 44 can be executed by the Hypervisor associated with the VM 10. The memory 42 stores a plurality of active memory pages (AMP) 46. There is an interface (I/F) 48, such as an RDMA adapter 32 shown in FIG. 2, to the distributed page storage 36 by which inactive, dormant memory pages can be swapped out. Another interface (I/F) 50 provides connectivity to the regular storage 16 wherein is stored an OS, file system and other code and data required to operate the VM 10.

Figure 4:
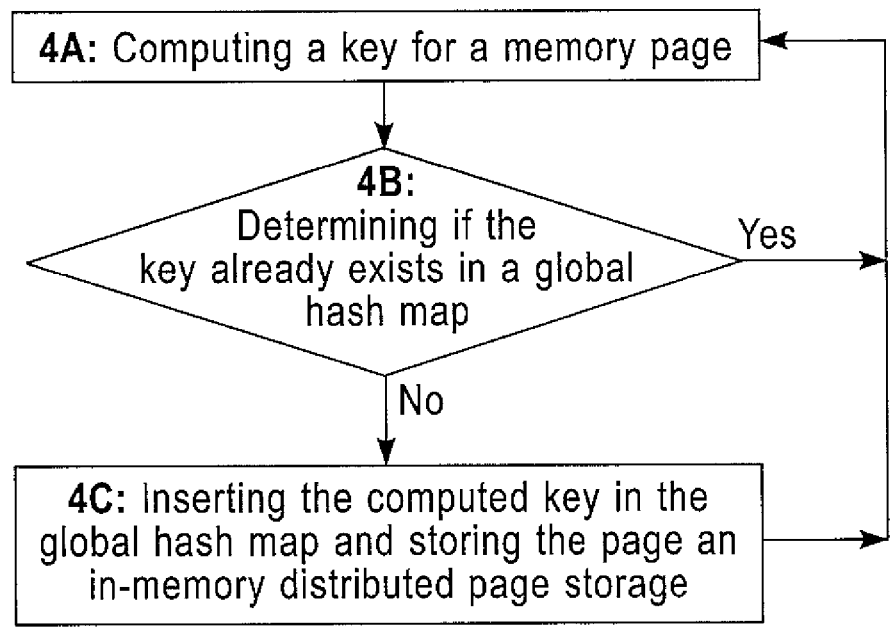
FIG. 4 illustrates a logic flow diagram that is descriptive of a de-duplication method and the execution of computer program code, in accordance with exemplary embodiments of this invention.

With respect to an example of de-duplication reference can be made to FIG. 4. At Block 4A a key is computed for a memory page, i.e., the page is hashed using a selected hashing algorithm. At Block 4B a check is made to determine if the key already exists in the global hash map (GHM) 38. If it does then the page is ignored (as it already exists in the in-memory distributed page storage 36) and a loop back to Block 4A is made until all memory pages have been processed. If the computed key is found to not already exist in the GHM 38 then at Block 4C the computed key is inserted in the GHM 38 and the page is stored in the in-memory distributed page storage 36. Control then passes back to Block 4A to process a next memory page.

It can be noted if the key is found to exist in the GHM 38 during the check made at Block 4B that the key could have been previously computed and stored by another VM that is a part of an associated VM cluster. That is, a particular cached memory page can be one that is (identically) common to two or more VMs of the cluster (or in a cluster of clusters) and is made sharable across the cluster of VMs.

It can also be noted that an issue can arise of how to best recover from a server failure in a cluster embodiment where the page storage is implemented in a distributed memory cache across different servers. It is within the scope of the examples of the embodiments of this invention for a certain (primary) server (coupled with one or both of the in-memory distributed page storage 36 and the GHM 38) to be replicated to physically separated servers in order to mitigate the possibility of the failure of a single primary cluster server that is responsible for one or both of the in-memory distributed page storage 36 and the GHM 38. In this manner cluster fault tolerance is enhanced.

Thus, it is a further aspect of the examples of the embodiments of this invention for a (primary) system server that is responsible for one or both of the shared memory page cache 36 and the global hash map (GHM) 38 to be replicated so as to provide fault tolerance against a failure of the system server.

Reference with respect to one suitable embodiment of the GHM 38 can be found in commonly-owned U.S. patent application Ser. No. 13/683,319, filed 21 Nov. 2012, entitled RDMA-Optimized High-Performance Distributed Cache, Xavier R. Guerin and Tiia J. Salo. incorporated by reference herein. In this commonly-owned U.S. patent application there are described apparatus and methods to provide remote direct memory access (RDMA) by a client to a data record stored in a cache on a server. A hash map is published from the server to the client, where the hash map includes one or more entries associated with a key for the data record stored in the cache on the server. Each of the entries stores a server-side remote pointer and the server-side remote pointer references the data record stored in the cache on the server. The client, using the key, looks up the server-side remote pointer for the data record from the hash map, and then performs one or more RDMA operations using the server-side remote pointer that allow the client to directly access the data record stored in the cache on the server.

In a conventional system a flow has to pass through, a TCP/IP stack at least four times, e.g., Client to Network Interface Controller (NIC), NIC to Server, Server to NIC, and NIC to Client. Moreover, a data object has to undergo a (de)serialization operation twice, and the data object is copied multiple times as it flows through the numerous I/O stack layers. As a result, remote access may be several orders of magnitude slower than local access.

Embodiments of the invention described in the above-referenced commonly-owned U.S. patent application Ser. No. 13/683,319 include a re-architected, distributed key-value pair cache that is configured suitably for RDMA communication and that avoids the above described TCP/IP protocol stack issues while reducing operating system involvement for data transfers. This results in extremely fast, key-based cache lookups over a network.

Instead of providing clients with a remote get/put interface to a cache stored on a server, the server publishes a hash map to the clients that contains key-value pairs made of the cache entries' keys paired to their remote RDMA pointers. The hash map allows a client to look-up a cache entry's remote RDMA pointer locally using its key and then access the cache entry on the server using the remote RDMA pointers in one-sided RDMA operations.

One-sided RDMA operations do not involve server-side software since these operations are performed by an RDMA NIC, where the NIC performs a DMA operation directly to or from the server's memory. This results in low server CPU utilization even under a heavy load. Specifically, read, update and delete operations can be implemented using one-sided RDMA operations, while create operations employ some server-side software involvement since create operations introduce new keys that are broadcasted to all clients.

It should be noted that the embodiments of the present invention are not limited for use with the RDMA cache embodiments disclosed in the above-referenced commonly-owned U.S. patent application Ser. No. 13/683,319, which is referenced as providing one non-limiting example of a suitable RDMA cache that can be used when implementing the exemplary embodiments of the invention described in this patent application.

Figure 5:
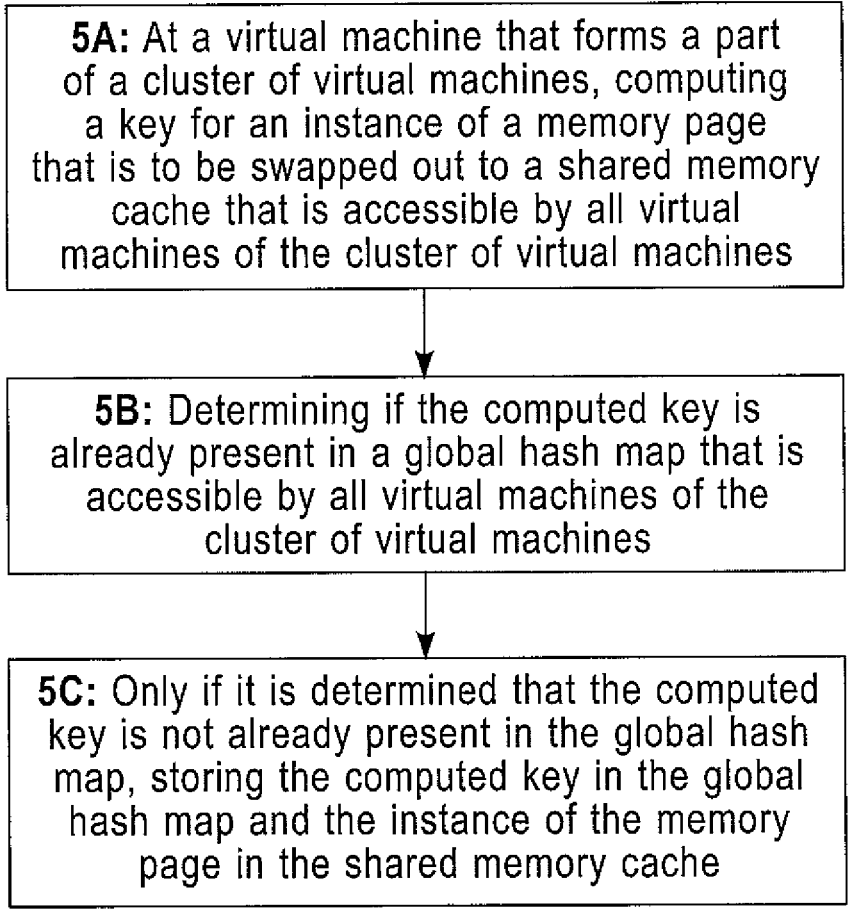
FIG. 5 illustrates a logic flow diagram that is descriptive of a method, and the execution of computer program code, in accordance with exemplary embodiments of this invention.

Referring to FIG. 5 there is shown a logic flow diagram that is descriptive of a method, and the execution of computer program code, in accordance with exemplary embodiments of this invention. The logic flow diagram can be considered to represent actions performed by the SW 44 of FIG. 3 when executed by the at least one data processor 40. At Block 5A there is a step performed at a virtual machine that forms a part of a cluster of virtual machines of computing a key for an instance of a memory page that is to be swapped out to a shared memory cache that is accessible by all virtual machines of the cluster of virtual machines. At Block 5B there is a step of determining if the computed key is already present in a global hash map that is accessible by all virtual machines of the cluster of virtual machines. At Block 5C there is a step performed, only if it is determined that the computed key is not already present in the global hash map, of storing the computed key in the global hash map and the instance of the memory page in the shared memory cache.

In the method as depicted in FIG. 5, the step of computing the key comprises at least in part processing the instance of the memory page using a hashing algorithm.

In the method as depicted in FIG. 5 the shared memory cache is comprised of an in-memory shared memory cache, and access to the in-memory shared memory cache is made via remote direct memory access (RDMA) interconnects.

In the method as depicted in FIG. 5 where prior to a step of migrating the virtual machine from a first instance of a virtual machine to a second instance of a virtual machine, there is a step of sending information relating to a plurality of the keys to the second instance of the virtual machine enabling the second instance of the virtual machine to retrieve a corresponding plurality of memory pages from the shared memory cache.

In the method as depicted in FIG. 5 and as stated in the previous paragraph, the information comprises a pointer to a location where the plurality of keys are stored, and the plurality of keys can be stored, for example, with the memory pages in the shared memory cache.

In the method as depicted in FIG. 5, and for a memory page that is identical to a memory page associated with another virtual machine of the cluster of virtual machines, there is a single key identifying the memory page in the global hash map.

Figure 6:
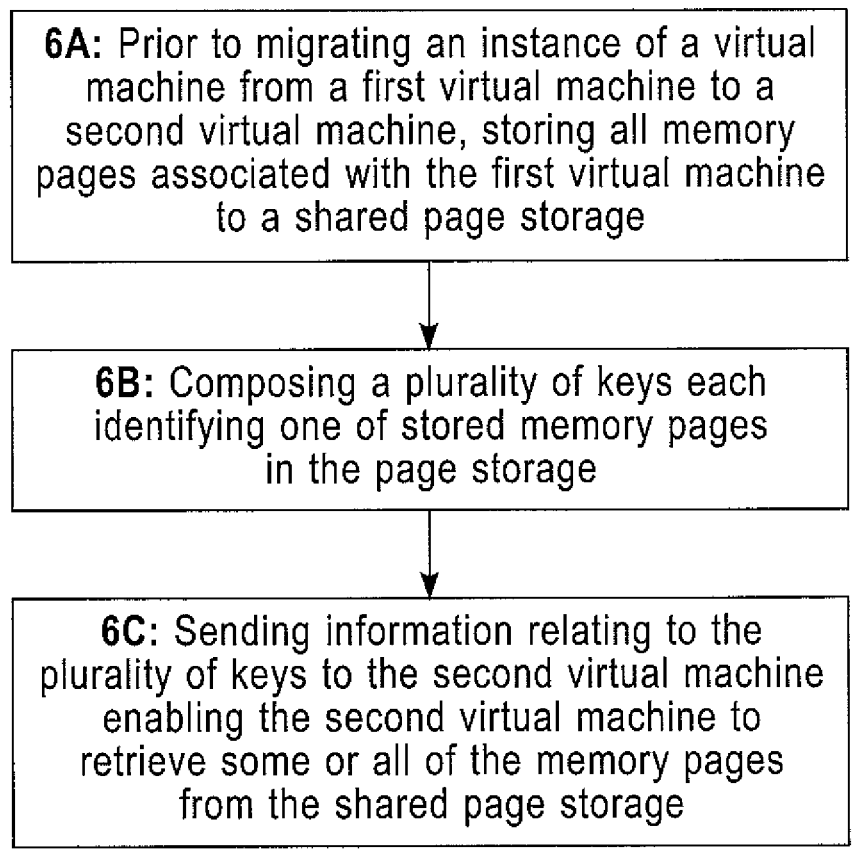
FIG. 6 illustrates a logic flow diagram that is descriptive of a method, and the execution of computer program code, in accordance with one possible use case of VM migration for the exemplary embodiments of this invention.

Referring to FIG. 6 there is shown a logic flow diagram that is descriptive of a method, and the execution of computer program code, in accordance with one possible use case for the exemplary embodiments of this invention. The logic flow diagram can also be considered to represent actions performed by the SW 44 of FIG. 3 when executed by the at least one data processor 40. At Block 6A there is a step performed, prior to migrating an instance of a virtual machine from a first virtual machine to a second virtual machine, of storing all memory pages associated with the first virtual machine to a shared page storage. At Block 6B there is a step of composing a plurality of keys each identifying one of stored memory pages in the page storage. At Block 6C there is a step of sending information relating to the plurality of keys to the second virtual machine enabling the second virtual machine to retrieve some or all of the memory pages from the shared page storage.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a 'circuit', a 'module' or a 'system'. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including art object oriented programming language such as Java, Smalltalk, C++ or the like and conventional procedural programming languages, such as the "C" programming language or similar programming languages. The program code may execute entirely on a single local computer, partly on the local computer, as a stand-alone software package, partly on the local computer and partly on a remote computer or entirely on the remote computer or server. In the latter scenario, the remote computer may be connected to the local computer through any type of network, including a LAN or a WAN, or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method comprising:
    at a virtual machine that forms a part of a cluster of virtual machines, computing a key for an instance of a memory page that is to be swapped out to a shared memory cache that is accessible by all virtual machines of the cluster of virtual machines;
    determining if the computed key is already present in a global hash map that is accessible by all virtual machines of the cluster of virtual machines; and
    only if it is determined that the computed key is not already present in the global hash map, storing the computed key in the global hash map and the instance of the memory page in the shared memory cache.

2. The method as in claim 1, where computing the key comprises at least in part processing the instance of the memory page using a hashing algorithm.

3. The method of claim 1, where the shared memory cache is comprised of an in-memory shared memory cache and where access to the in-memory shared memory cache is via remote direct memory access (RDMA) interconnects.

4. The method of claim 1, where prior to migrating the virtual machine from a first instance of a virtual machine to a second instance of a virtual machine, sending information relating to a plurality of the keys to the second instance of the virtual machine enabling the second instance of the virtual machine to retrieve a corresponding plurality of memory pages from the shared memory cache.

5. The method as in claim 4, where the information comprises a pointer to a location where the plurality of keys are stored.

6. The method as in claim 5, where the plurality of keys are stored with the memory pages in the shared memory cache.

7. The method as in claim 1, where for a memory page that is identical to a memory page associated with another virtual machine of the cluster of virtual machines there is a single key identifying the memory page in the global hash map.

8. A non-transitory computer-readable storage medium containing data representing computer-executable program code, where execution of the program code results in operations that comprise:
    at a virtual machine that forms a part of a cluster of virtual machines, computing a key for an instance of a memory page that is to be swapped out to a shared memory cache that is accessible by all virtual machines of the cluster of virtual machines;
    determining if the computed key is already present in a global hash map that is accessible by all virtual machines of the cluster of virtual machines; and
    only if it is determined that the computed key is not already present in the global hash map, storing the computed key in the global hash map and the instance of the memory page in the shared memory cache.

9. The non-transitory computer-readable storage medium as in claim 8, where computing the key comprises at least in part processing the instance of the memory page using a hashing algorithm.

10. The non-transitory computer-readable storage medium as in claim 8, where the shared memory cache is comprised of an in-memory shared memory cache and where access to the in-memory shared memory cache is via remote direct memory access (RDMA) interconnects.

11. The non-transitory computer-readable storage medium as in claim 8, where prior to migrating the virtual machine from a first instance of a virtual machine to a second instance of a virtual machine, sending information relating to a plurality of the keys to the second instance of the virtual machine enabling the second instance of the virtual machine to retrieve a corresponding plurality of memory pages from the shared memory cache.

12. The non-transitory computer-readable storage medium as in claim 11, where the information comprises a pointer to a location where the plurality of keys are stored.

13. The non-transitory computer-readable storage medium as in claim 12, where the plurality of keys are stored with the memory pages in the shared memory cache.

14. The non-transitory computer-readable storage medium as in claim 8, where for a memory page that is identical to a memory page associated with another virtual machine of the cluster of virtual machines there is a single key identifying the memory page in the global hash map.

* * * * *